United States Patent [19]

Jandl et al.

[11] 4,110,977

[45] Sep. 5, 1978

[54] PYROGEN IGNITER RAMJET IGNITION SYSTEM

[75] Inventors: Frank W. Jandl, Orange, Calif.; Gregory D. Colman, DeRidder, La.

[73] Assignee: The United States of America as represented by the Secretary of the Navy, Washington, D.C.

[21] Appl. No.: 806,210

[22] Filed: Jun. 13, 1977

[51] Int. Cl.² .................................. F02K 7/10
[52] U.S. Cl. .................. 60/270 R; 60/39.82 E
[58] Field of Search ............ 60/270 R, 39.82 E, 270 S

[56] References Cited

U.S. PATENT DOCUMENTS

| 2,447,758 | 8/1948 | Lubbock et al. | 60/39.82 E |
| 2,731,079 | 1/1956 | Smits | 60/39.82 E |
| 2,972,231 | 2/1961 | Mullen | 60/39.82 E |
| 3,807,170 | 4/1974 | Kesting | 60/270 R |
| 4,050,243 | 9/1977 | Holzman et al. | 60/270 S |

*Primary Examiner*—Robert E. Garrett
*Attorney, Agent, or Firm*—R. S. Sciascia; Roy Miller; W. Thom Skeer

[57] ABSTRACT

An ignition system for initiating combustion in a ramjet engine characterized by a replaceable propellant grain type igniter set into the wall of a ram air tube supplying air and fuel to the engine combustion chamber. The igniter is fitted into a small available void space between a fairing at the rear of the ram air tube and a fin member which intersects the fairing. The direction of the igniter flame is controlled by angular tubular connections communicating with the ram air tube.

11 Claims, 4 Drawing Figures

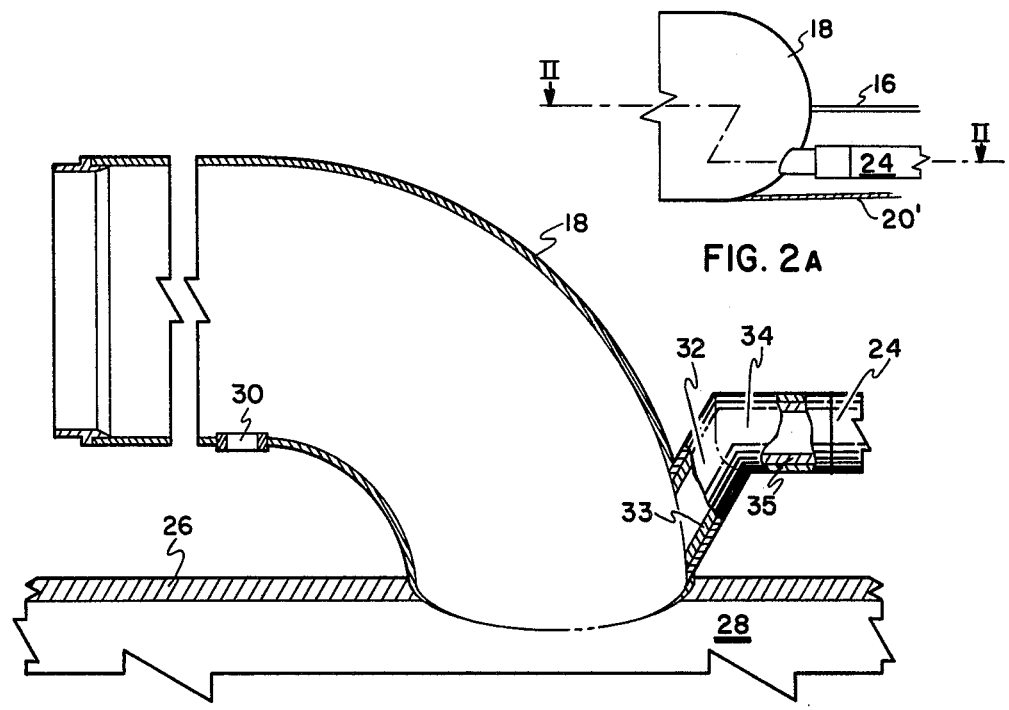
FIG. 2A.
FIG. 2.
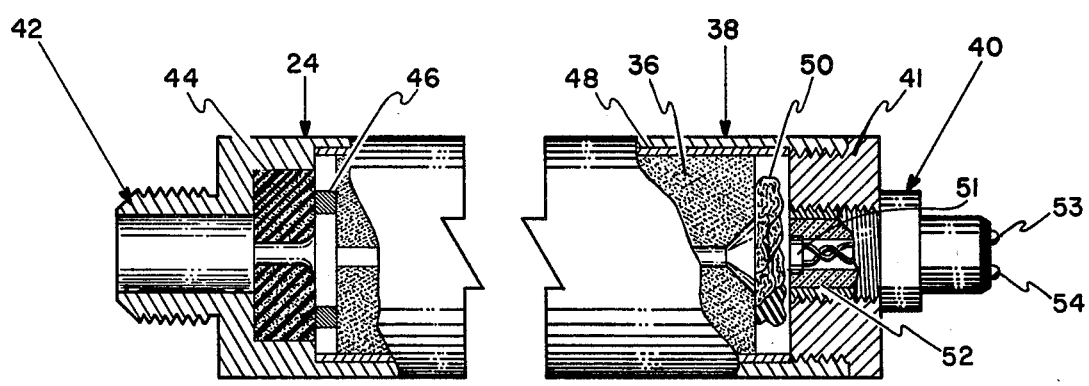
FIG. 3.

PYROGEN IGNITER RAMJET IGNITION SYSTEM

BACKGROUND OF THE INVENTION

1. Field of the Invention

The present invention relates to air breathing propulsion engines and particularly to those engines which are termed ramjets. More particularly, the present invention relates to an improved ignition system for reliably initiating burning in the combustion chamber of a ramjet powered missile.

2. Discussion of the Prior Art

Ramjet engines have been ignited, in the past, by various ignition devices placed within the combustion chamber and such an arrangement is disclosed in U.S. Pat. No. 2,981,065 issued Apr. 25, 1961 to David H. Sloane.

These prior art ignition devices, however, necessitated modification of the combustion chamber, including ducts and struts and, in comes cases, flame holders or flame spreaders were added. Also, it was found that it was usually necessary to supply a plurality of ignition units.

These prior art devices were generally unreliable and were usually complicated and expensive. Furthermore, there was no provision for repeated use of the engine nor replacement or maintenance of the igniton devices.

SUMMARY OF THE INVENTION

The present invention is designed to provide a simple, economincal, easily maintainable ignition system for a ramjet engine which will, at the same time, be efficient and reliable. The placement of a replaceable ignition device outside of the engine prevents its destruction, and eliminates the necessity for any baffles, ducts or other igniter accessories within the combustion chamber.

According to the present invention, a propellant grain type ignition device is attached in communication with at least one of the ram air intake tubes of a ramjet engine. The igniter opening is placed between the fuel injection area and the junction of the ram air tube with the combustion chamber. This placement of the ignition device has been found to be efficient and reliable in initiating burning in the combustion chamber as well as providing ease of access to the ignition device for installation and for replacement when the engine is to be reused. This last feature is of great importance, for example, where the engine is to be used for static or captive flight testing.

BRIEF DESCRIPTION OF THE SEVERAL VIEWS OF THE DRAWING

FIG. 2 is a detailed view, partly in section, of one of the air intake tubes of FIG. 1;

FIG. 2a is a top plan view of the detail of FIG. 2; and

FIG. 3 is an enlarged detailed view partly in section of a propellant type igniter useable with the device of FIG. 1.

DESCRIPTION OF THE PREFERRED EMBODIMENT

Figure 1:
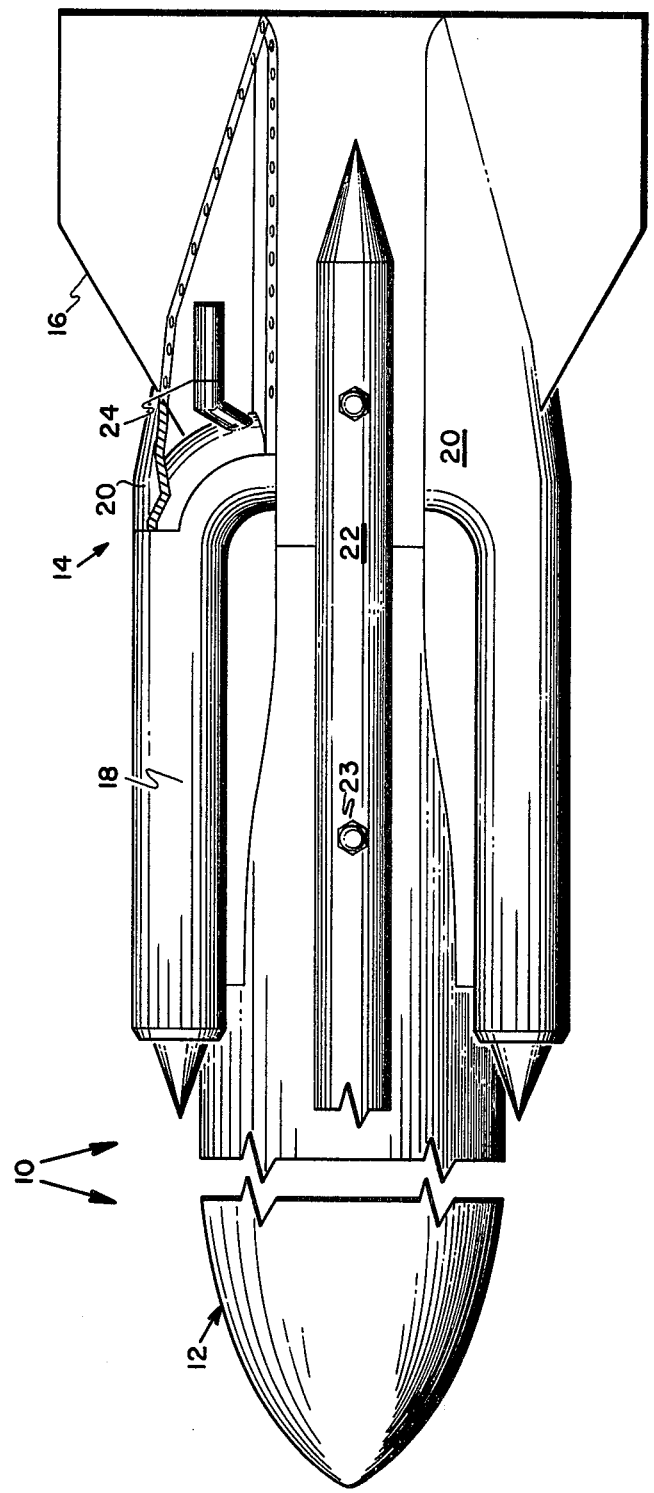
FIG. 1 is a side elevational view of a ramjet engine missile incorporating the present invention with parts removed for clarity.

The operation of the present invention may be better understood by consideration of a particular ramjet powered vehicle in the form of a missile indicated generally at 10 in FIG. 1 of the drawing. The ramjet vehicle 10 may be generally separated into a nose section 12 and a tail section 14. The tail section 14, of the device illustrated, houses the ramjet engine and is fitted externally with a plurality of fin members 16 and ram air intake tubes 18. Each ram air intake tube is fitted rearwardly with an aerodynamic fairing 20, 20' tapering to the aft end of the vehicle. A longitudinal fairing 22 is shown fastened alongside the vehicle by bolts 23 to house electrical cables, fuel lines and the like.

For purposes of illustration, one of the fairings 20' has been partly removed in FIG. 1, revealing the placement of an ignition device 24 in accordance with the present invention. The ignition device 24 is situated between the fin 16 and fairing 20' associated therewith.

A more detailed view of a ram air tube 18, carrying an ignition device 24 is shown in FIGS. 2 and 2a. The ram air tube 18 is integrally fastened to the body 26 of the ramjet, with the aft end of the tube opening into the combustion chamber 28. The tube 18 is provided with a fuel fitting 30 spaced slightly forward from the juncture of the aft end of the tube 18 and the body 26. On the aft end of tube 18, near the juncture with body 26, an igniter boss tube 32 is set into the wall of tube 18 at an angle of about 30° to the longitudinal axis of the missile. Integrally attached to the igniter boss tube 32 is a hollow boss 34 adapted to threadedly receive the igniter 24. The boss 34 is fastened to the tube 32 such that the longitudinal axis of boss 34 is parallel to the longitudinal axis of chamber 28, so that the igniter assembly will fit into the space between conduit fairing 20' and its associated fin member 16.

The igniter boss tube 32 is fitted with an insert 33 and the boss 34 is fitted with a similar insert 35. These inserts 33, 35 are preferably of a refractory material such as graphite and may be angularly bored as discussed below.

A specific embodiment of the igniter 24 is illustrated in FIG. 3, wherein a perforated propellant grain 36 is contained within a housing 38. The housing 38 is internally threaded on one end to receive an end cap 41 which is, in turn, threaded to receive an electrically operable ignition initiator, or squib, 40. Housing 38 is externally threaded at the other end, as indicated at 42, for attachment to the boss 34.

A nozzle insert 44 is press-fitted into the end of igniter case 38 near the attachment end 42. The propellant grain 36 is shown spaced from the nozzle insert 44 by a plurality of pads 46 of sponge rubber, or the like, which are preferably bonded to the base of the propellant grain 36 for ease in assembly. An inhibiter coating 48 may be included between grain 36 and igniter case 38, or the grain may be inhibited in any known fashion depending upon the burning characteristics desired.

Between the ignition end of grain 36 and the squib initiator 40, sufficient room is provided to contain a small package of ignition aid 50. This ignition aid may consist, for example, of about 1 gram of boron-potassium nitrate $BKNO_3$, in a suitable moisture proof plastic pouch.

The ignition initiator device 40 is preferably a dual bridge squib with external threads to engage the internal threads in end cap 41. For safety reason, it is recommended that a one ampere-one watt NO FIRE type of squib is used. The squib 40, which is shown, is conventional and includes a primer 51 and a main ignition charge 52, which may be ignited when sufficient current (usually about 5 amperes) is applied across terminals 53, 54.

Upon application of proper current across terminals 53, 54 the squib will fire. When the squib fires, burning of the primer 51 and the main ignition charge 52 causes the ignition aid material 50 to ignite. The propellant grain is thus ignited and, depending upon how the particular grain has been inhibited, the burning will proceed accordingly. The hot gases (4500° F) exit through the nozzle 44 and proceed through the inserts 33, 35 of the boss 34 and tube 32 respectively. The burning gases are thus oriented to the desired direction by using the angle between the inserts as the turning angle. The hot gases then enter the engine approximately at the juncture of the ram air tube 18 with the combustion chamber 28.

The results of tests conducted at the Naval Weapons Center on a ramjet engine according to the present invention have shown a very high reliability of ignition. The production of igniters according to the present invention has been shown to be very inexpensive in relation to prior ignition devices. Ignition burn time may be varied from 1.5 to 3 seconds according to the aperture size of nozzle 44 and the characteristics of grain 36. In this range there may occur a slight decrease in igniter performance, but with no noticable difference in engine lighting ability. When the achievement of proper engine conditions for ignition have not been accurately ascertained, a longer burn time will allow the igniter to be lit before the expected proper engine conditions and still insure that there will be burning when the conditions necessary for engine ignition occur.

Under actual test conditions at the Naval Weapons Center the ignition system has exhibited one hundred percent capability to light the engine. These tests have shown that the engine will sometimes light even when the conditions are as much as ten percent off the minimum lighting conditions. Even under marginal conditions, the igniter has the tendency to force the engine to the proper conditions.

Experimentation has shown that the direction of the ignition gases may be optimized and the direction of the gases is controllable to a degree simply by altering the angle at which the igniter boss and tube are welded together. Slight changes in direction can be accomplished simply by altering the angle of the bore in the individual inserts 33, 35.

The entire igniter assembly requires very little space and easily is accomodated in the space between the fairing 20' and the fin 16 associated with any particular ram air tube. The fact that the igniter case, boss and tube are reusable is a cost cutting factor when used in testing and with recoverable engines.

The present material for the igniter case is a 300 series stainless steel, the boss and tube inserts graphite (Spear 8882) and the nozzle 44 is made of a high temperature laminated plastic known as Micarta. However, other materials with similar capabilities could be used.

What is claimed is:

1. In a ramjet engine comprising,
   a. a combustion chamber;
   b. a plurality of ram air tubes each having an aft end communicating with said combustion chamber and a forward open end for air intake;
   c. means for introducing fuel into each said ram air tube at a point intermediate said ends; and
   d. igniter means associated with at least one said ram air tube and being effective, when operated, to inject a flame into said one tube intermediate said point and said aft end sufficient to cause burning of the fuel air mixture passing from said ram air tube into said chamber.

2. The apparatus of claim 1 wherein said igniter means comprises:
   a housing having a first end adapted to receive an ignition initiator device and a second end;
   said second end comprising means for attaching said housing for communication with said one of said ram air tubes;
   a propellant grain in said housing;
   electrically operable ignition initiator means initiating burning of said propellant grain in said first end; and
   a nozzle insert in said second end for controlling the flame of said grain.

3. The apparatus of claim 2 wherein means is provided for attaching said housing to said ram air tube including an igniter tube integrally fastened to and providing communication with said ram air tube and a boss having one end angularly fastened to said igniter tube and the other end receiving the said second end of said igniter.

4. The apparatus of claim 3 wherein said boss and said igniter tube include inserts of refractory material and the angular attachment of said tube and boss being such as to direct the flame from said igniter into said ram air tube near the juncture thereof with the combustion chamber.

5. The apparatus of claim 4 wherein said inserts are angularly bored to affect the direction of the igniter flame.

6. The apparatus of claim 1 wherein said igniter means includes means for connecting said igniter means to said tube such that the flame from said ignitor means is directed into said ram air tube near the juncture thereof with said combustion chamber.

7. The apparatus of claim 6 wherein said igniter comprises a propellant grain and electrically operable means for initiating burning of said grain.

8. The apparatus of claim 7 wherein said igniter means includes a propellant housing and said means for connecting said igniter means to said ram air tube include an ignitor tube integrally fastened to and providing communication with said ram air tube and a boss having one end angularly fastened to said igniter tube and the other end adapted to threadedly receive said propellant housing.

9. The apparatus according to claim 8 wherein said boss and said igniter tube include inserts of refractory material.

10. The apparatus of claim 9 wherein said inserts are angularly bored to affect the direction of the igniter flame.

11. The apparatus of claim 7 including an ignition aid comprising about 1 gram of boron-potassium nitrate placed between said electrically operable means and said propellant grain.

* * * * *